Patented Apr. 12, 1949

2,467,122

UNITED STATES PATENT OFFICE 2,467,122

CAST REFRACTORY PRODUCTS

Theodore Estes Field, Louisville, Ky., assignor to Corhart Refractories Company, Louisville, Ky., a corporation of Delaware No Drawing. Application April 10, 1945, Serial No. 587,614

9 Claims. (Cl. 106—62)

The tremendous increase in production of magnesium and its alloys has emphasized the unsatisfactory performance of presently available refractories for melting and containing the molten metals. It is an object of this invention to disclose a novel and improved heat cast refractory for this and similar purposes. By heat cast is meant the complete melting of the ingredients as for example with the techniques disclosed in U. S. Patent #1,615,750 to Fulcher, and shaping into the desired form by casting into molds and solidifying.

Magnesium is an extremely reactive metal and its attack is apparently chemical, resulting in the formation of MgO and the metal of the refractory oxide. Large well developed crystals such as are obtained by heat casting as opposed to the usual burning minimize the surface area exposed to attack. Because of its ready castability in small shapes and relatively high resistance to spalling for a cast refractory, soda beta alumina (ideally $Na_2O.11Al_2O_3$) castings have been employed with considerable success. Such castings unlike most heat cast refractories are apt to have considerable porosity, so much so in fact that the normal pipe resulting from the change in volume from liquid to crystal is often completely absent, this volume change being distributed as pores between the platy crystals. Any porosity of course is a disadvantage since it permits penetration of the metal with an increase in area of attack. Furthermore reaction in the interior of a refractory is particularly destructive since it often occurs with an increase in volume tending to disrupt the refractory. The resistance of beta alumina castings to spalling is apparently associated with the low elastic constants resulting from the loose jointed, platy crystallization.

In another application I have disclosed that well developed crystals of magnesium spinel ($MgO.Al_2O_3$) are very resistant to attack by magnesium. Theoretically the MgO part of the composition is not reducible by Mg at all.

In their original investigations of the high temperature phases of the $MgO-Al_2O_3$ system, Rankin and Merwin found that a beta alumina phase occurred at times and concluded that it was monotropic since its appearance could not be predicted. I have discovered however that the beta alumina which is produced with $Na_2O$ added is perfectly stable in the presence of spinel and can be produced at will. In other words the MgO does not cause the alumina to crystallize as corundum but instead the alumina divides up between the MgO forming $MgO.Al_2O_3$ and the $Na_2O$ forming $Na_2O.11Al_2O_3$ and only in the case of a deficiency of MgO and $Na_2O$ does corundum occur as an additional crystal phase.

Since spinel and beta alumina are thus discovered to be mutually compatible it is possible to make by combining the two phases, a cast refractory which may be considered either a beta alumina refractory with improved chemical resistance due to the presence of spinel or a spinel refractory with improved spalling resistance due to the presence of the beta alumina. Since the problem of chemical resistance is usually the most serious I normally prefer the spinel phase as major ingredient but by changing the proportions a graduation in properties can be obtained. While the property of chemical resistance is more or less additive this is not the case with the elastic properties presumably because of the interlocking of crystals which occurs when two or more different phases are present. Nevertheless it may be stated qualitatively that the resistance to spalling increases as the betal alumina proportion increases.

For the best castings, I prefer to use the pure alumina commonly used for metal production by electrolysis. A good grade of calcined magnesite low in silica can be used for the MgO and soda ash may be used to supply the $Na_2O$ in which form the $Na_2O$ is introduced more cheaply than as sodium aluminate. While $K_2O$ forms an analogous beta alumina phase, potassium sources are normally more expensive and its use offers no outstanding advantages. In the absence of MgO, the addition of some 6 or 7% $SiO_2$ suppresses the beta alumina crystallization and yields instead alpha alumina (corundum) and a siliceous glass containing the $Na_2O$ and saturation amounts of $Al_2O_3$. In the presence of MgO, the effect of $SiO_2$ is much more pronounced and in a melt with only 4.5% $SiO_2$ the beta alumina phase almost vanished although sufficient $Na_2O$ was present to theoretically form 50% of this phase. In this system as silica is added the beta alumina decreases and besides the silicous glass phase, spinel is formed with $Al_2O_3$ in solid solution. To gain any benefit of a beta alumina phase it is therefore essential to keep silica at a minimum. Since the raw materials are completely melted however it is obvious that any combination of raw materials which will yield the desired chemical analysis can be used.

Compositions in this system which have given good cast refractories are illustrated in Table I.

Table I

| Melt | Al$_2$O$_3$ | MgO | Na$_2$O | CaO | SiO$_2$ | K$_2$O | Calculated Phases | |
|---|---|---|---|---|---|---|---|---|
| | | | | | | | Spinel | Beta alumina |
| A | 77.0 | 21.2 | 1.3 | .3 | .2 | | 75 | 25 |
| B | 83.0 | 14.0 | 2.7 | .2 | .1 | | 50 | 50 |
| C | 88.6 | 7.2 | 4.0 | .1 | .1 | | 25 | 75 |
| D | 82.4 | 14.0 | 1.3 | .2 | .1 | 2.0 | 50 | 50 |

In this system spinel crystallization takes precedence over the beta alumina crystallization. Thus when 28% MgO and 2.4% Na$_2$O were added to Al$_2$O$_3$, spinel was the dominant crystal phase and no beta alumina was found petrographically. It is therefore essential to keep the MgO down to that required for the desired amount of spinel as well as to add the proper amount of Na$_2$O for the beta alumina.

If less than enough MgO is present to convert to spinel all Al$_2$O$_3$ not required for the beta alumina, a corundum phase might be expected. Actually if appreciable beta alumina is present, the excess Al$_2$O$_3$ will be almost completely taken into solid solution with the spinel. This phase of solid solution of Al$_2$O$_3$ in MgO.Al$_2$O$_3$ is also quite resistant to chemical attack by magnesium and its formation is not necessarily to be avoided.

Examples of good compositions in this system are shown in Table II.

Table II

| Melt | Al$_2$O$_3$ | MgO | Na$_2$O | CaO | SiO$_2$ | Beta Al$_2$O$_3$ | Excess Al$_2$O$_3$ |
|---|---|---|---|---|---|---|---|
| E | 90.7 | 7.4 | 1.7 | .15 | .01 | 32 | 42 |
| F | 89.5 | 7.3 | 3.0 | .15 | .01 | 57 | 17 |
| G | 86.8 | 10.0 | 3.0 | .20 | .02 | 56 | 8 |

In melt E there is more Al$_2$O$_3$ than can be taken into solution by the spinel, and corundum is also present as a phase.

Since in spinel the Al$_2$O$_3$ percentage is 2.5 times the MgO and since in beta alumina the Al$_2$O$_3$ is 18.0 times the Na$_2$O or 11.9 times the K$_2$O, an excess of flux can be avoided by using Al$_2$O$_3$ in at least these proportions to the actual fluxes present. An excess of alkali metal oxide is particularly harmful to corrosion by magnesium when SiO$_2$ is present. If it is desirable to use a batch containing both Na$_2$O and K$_2$O, an excess of alkali can be avoided by calculating the alumina required by each separately.

By "principally" in the following claims I mean over 95% of the total composition.

What I claim is:

1. A heat cast refractory composed principally of beta alumina and magnesium spinel and in which the beta alumina lies between 20% and 80% and in which alkali oxide is present in an amount at least six times that of silica.

2. A heat cast refractory composed principally of beta alumina and magnesium spinel and in which the magnesium spinel lies between 50% and 80% and in which alkali oxide is present in an amount at least six times that of silica.

3. A heat cast refractory composed principally of 20% to 80% beta alumina and a solid solution of alumina in magnesium spinel and in which alkali oxide is present in an amount at least six times that of silica.

4. A heat cast refractory composed principally of 20% to 50% beta alumina, corundum and a solid solution of alumina in magnesium spinel and in which the MgO lies between 5.5% and 22.5% by weight by chemical analysis and in which alkali oxide is present in an amount at least six times that of silica.

5. A heat cast refractory composed principally of Al$_2$O$_3$ and containing 5.5% to 22.5% MgO and 1% to 4% Na$_2$O by weight by chemical analysis in which the percentage of Al$_2$O$_3$ is not less than the sum of 2.5 times the percentage of MgO plus 18.0 times the percentage of Na$_2$O and in which alkali oxide is present in an amount at least six times that of silica.

6. A heat cast refractory composed principally of Al$_2$O$_3$ and containing 5.5% to 22.5% MgO, 1% to 4.2% Na$_2$O and 0% to 5% SiO$_2$ by weight by chemical analysis and in which the percentage of Al$_2$O$_3$ is not less than the sum of 2.5 times the percentage of MgO plus 18.0 times the percentage of Na$_2$O and in which alkali oxide is present in an amount at least six times that of silica.

7. A heat cast refractory composed principally of Al$_2$O$_3$ and containing 5.5% to 22.5% MgO and 1.5% to 6.2% K$_2$O by weight by chemical analysis and in which the percentage of Al$_2$O$_3$ is not less than the sum of 2.5 times the percentage of MgO plus 11.9 times the percentage of K$_2$O and in which alkali oxide is present in an amount at least six times that of silica.

8. A heat cast refractory composed principally of Al$_2$O$_3$ and containing 5.5% to 22.5% MgO, 1.5% to 6.2% K$_2$O and 0% to 5% SiO$_2$ by weight by chemical analysis and in which the percentage of Al$_2$O$_3$ is not less than the sum of 2.5 times the percentage of MgO plus 11.9 times the percentage of K$_2$O and in which alkali oxide is present in an amount at least six times that of silica.

9. A heat cast refractory composed principally of Al$_2$O$_3$ and containing 5.5% to 22.5% MgO, 0% to 5% SiO$_2$ and 1% to 6% of a group consisting of Na$_2$O and K$_2$O and in which the percentage of Al$_2$O$_3$ is not less than the sum of 2.5 times the percentage of MgO plus 11.9 times the percentage of K$_2$O plus 18.0 times the percentage of Na$_2$O and in which alkali oxide is present in an amount at least six times that of silica.

THEODORE ESTES FIELD.

REFERENCES CITED

The following references are of record in the file of this patent:

UNITED STATES PATENTS

| Number | Name | Date |
|---|---|---|
| 2,075,694 | Benner et al. | Mar. 30, 1937 |
| 2,154,069 | Fessler et al. | Apr. 11, 1939 |
| 2,261,639 | Benner et al. | Nov. 4, 1941 |